United States Patent [19]
Kalivas

[11] Patent Number: 4,933,803
[45] Date of Patent: Jun. 12, 1990

[54] THREE PHASE LOSS PROTECTION CIRCUIT

[75] Inventor: Zissis Kalivas, Lorain, Ohio

[73] Assignee: Reliance Comm/Tec Corporation, Chicago, Ill.

[21] Appl. No.: 386,809

[22] Filed: Jul. 31, 1989

[51] Int. Cl.[5] .............................................. H02H 3/12
[52] U.S. Cl. ...................................... 361/85; 361/92; 363/52
[58] Field of Search ....................... 361/85, 86, 92, 88; 363/50, 52, 53, 51

[56] References Cited

U.S. PATENT DOCUMENTS 4,620,296 10/1986 Siemon .............................. 361/92 X

*Primary Examiner*—Derek S. Jennings
*Attorney, Agent, or Firm*—Michael M. Rickin

[57] ABSTRACT

A three phase loss protection circuit for a three phase rectifier. The rectifier includes a circuit which inhibits its operation when either of two of the three phases are lost. In response to the loss of the third phase, the loss protection circuit causes one of the other two phases to be lost at the input to the inhibiting circuit. The loss protection circuit does not interfere with the operation of the inhibiting circuit when either of the two phases are lost. In an alternative embodiment, the loss protection circuit includes circuitry to ensure that the rectifier is inhibited even though part of a lost phase may be recreated by the rectifier's input filter.

6 Claims, 3 Drawing Sheets

THREE PHASE LOSS PROTECTION CIRCUIT

BACKGROUND OF THE INVENTION

1. Field of the Invention

This invention relates to rectifiers and more particularly, to those rectifiers whose inputs are connected to a three phase source.

2. Description of the Prior Art

Rectifiers include internal power supply circuits, also known as auxiliary supplies, to provide the operating voltages for the electronics used in the rectifier. When the rectifier is connected to a three phase source of power, the internal power supply circuit is connected to two of the phases. If either or both of those phases are lost, then the operation of the rectifier is inhibited as the auxiliary supply cannot provide the internal operating voltages.

A problem does, however, occur when the phase to which the internal supply circuit is not connected is lost. That phase will be referred to hereinafter as "the unconnected to phase". When the loss of that phase occurs, the operation of the rectifier should also be inhibited. As the internal supply circuit has in the past been connected only to the two non-lost phases, there isn't any loss of internal operating voltages as a result of the loss of the unconnected to phase.

One solution used in the past to inhibit the operation of the rectifier when the unconnected to phase is lost has been to turn the rectifier off. While that does provide the desirable result of turning off the rectifier when the unconnected to phase is lost, it does require that the rectifier be turned on when that phase is restored.

The rectifier typically has its three phase input connected through a full wave bridge to a capacitor bank. When all three phases are operational, a relatively low amplitude three phase ripple current having a frequency of 360 Hz flows through the capacitor bank. When any one of the three phases is lost, the amplitude of the ripple current increases substantially and has a frequency of 120 Hz. The ripple current amplitude may exceed the rating of the capacitors in the bank.

Other solutions to the loss of the unconnected to phase have involved limiting the current flow through the rectifier to keep it within the rating of the bank capacitor(s) or increasing the rating of the bank capacitor(s). The former increases the complexity of the rectifier, while the latter is quite expensive to implement.

It is desirable to have an internal power supply circuit which not only inhibits the operation of the rectifier when either of the two phases to which the internal supply circuit is connected are lost but also when the unconnected to phase is lost. It is also desirable that such a supply circuit be relatively easy to implement and not very costly as compared to the conventional supply circuit. The loss protection circuit of the present invention meets these requirements.

SUMMARY OF THE INVENTION

A phase loss protection circuit for a three phase rectifier. The rectifier has a circuit which responds to the loss of either the first or second of the three phases to inhibit the operation of the rectifier. The phase loss protection circuit has a first input for connection to the third of the three phases. It has a second input for connection to the second phase. The phase loss protection circuit also has a normally open controllable switch, such as a relay, which connects the inhibiting circuit to the second input.

The phase loss protection circuit further has a control circuit which responds to the voltage across the loss protection circuit inputs to close the switch. The control circuit responds to the loss of the third phase to open the switch. The opening of the switch causes the second phase to be lost to the inhibiting circuit.

In an alternative embodiment the phase loss protection circuit includes circuitry which ensures that the operation of the rectifier is inhibited even though a lost phase may be partially recreated at the input to the circuit.

DESCRIPTION OF THE PREFERRED EMBODIMENTS

Figure 1:
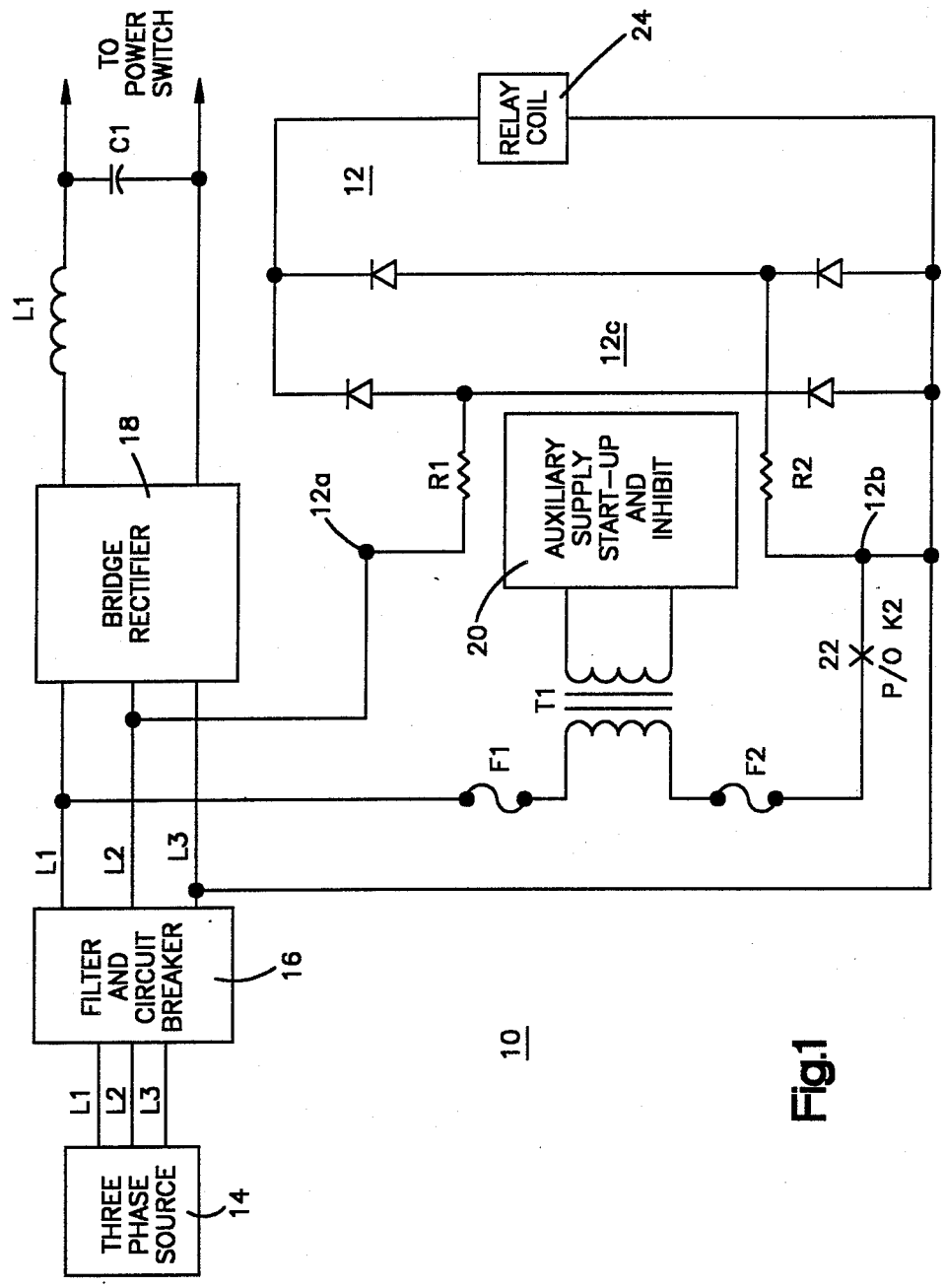
FIG. 1 is a block-schematic diagram of that part of a three phase rectifier which includes the loss protection circuit of the present invention.

Referring now to FIG. 1, there is shown a block-schematic diagram for a three phase rectifier 10 which includes the loss protection circuit 12 of the present invention. As rectifier 10 is otherwise conventional, only a part of the rectifier need be shown in FIG. 1.

Rectifier 10 has its inputs connected to a source 14 of three phase AC voltage. The three phases are connected by input filter and circuit breaker network 16 to the AC inputs of a three phase full bridge rectifier circuit 18. The filter included in network 16 is used to reduce electromagnetic interference. One DC output of circuit 18 is connected by an inductor L1 to a capacitor bank which is symbolically represented by the single capacitor C1. The other DC output is connected directly to C1. The capacitor C1 is then connected to power switch assemblies which for case of illustration are not shown in FIG. 1. As is well known in the art, the power switch assemblies are controlled so that rectifier 10 provides at its output a regulated DC voltage.

Rectifier 10 also includes, as is well known in the art, an internal power supply which is connected across two of the three phases at the input to the rectifier. The supply provides the auxiliary voltages for operating the electronics included in the rectifier. Such electronics typically include the circuitry which is used to drive the power switch assemblies as well as the power switches themselves. Rectifier 10 further includes, as is well known in the art, circuitry which is used when the rectifier is first started up and also circuitry which is used to inhibit the operation of the rectifier upon the occurrence of certain fault conditions. For ease of illustration, the internal supply, the start-up circuitry and the inhibit circuitry are shown in FIG. 1 as a single block 20, labeled "Auxiliary Supply, Start-up and Inhibit".

Block 20 is connected to the secondary side of transformer T1. The primary side of transformer T1 is connected through a fuse F1 to input phase one L1 and through the series combination of a fuse F2 and the normally open contacts 22 which are part of a relay K2 to input phase three L3.

The loss protection circuit 12 of the present invention has one input 12a connected directly to phase two L2 (the unconnected to phase) and the other input 12b connected directly to phase three L3. Circuit 12 includes full wave bridge rectifier 12c which has its AC inputs connected by resistors R1 and R2 to inputs 12a and 12b, respectively. The DC outputs of rectifier 12 are connected to the coil 24 of relay K2.

When three phase power is applied to rectifier 10, i.e. circuit breaker 16 is closed, a voltage appears across the input of circuit 12. Coil 24 of relay K2 is then energized to thereby close contacts 22. The primary winding of transformer T1 is then directly connected to phase three. Circuit 20 can then provide the necessary auxiliary voltages and start-up of rectifier 10.

Figure 2A:
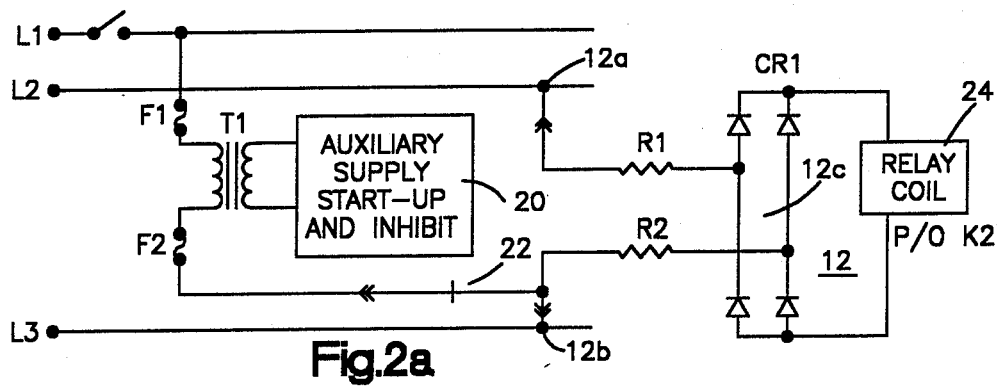
FIGS. 2a, 2b and 2c are equivalent diagrams for the operation of the loss protection circuit when either phase one or phase two or phase three is lost, respectively.
Figure 2B:
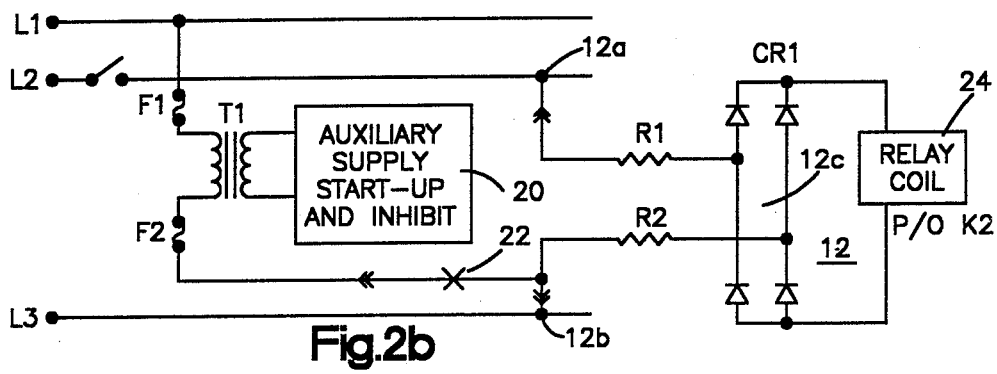
Figure 2C:
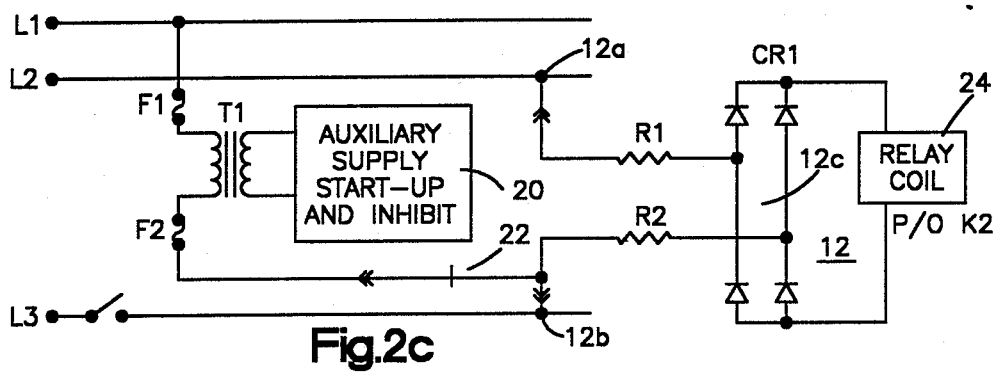

There are shown in FIGS. 2a, 2b and 2c respective equivalent diagrams for the operation of loss protection circuit 12 when either phase one or phase two or phase three are lost. These equivalent diagrams will be used to explain the operation of circuit 12.

Referring now to FIG. 2a, when phase one, i.e. L1, is lost, the input to circuit 20 is opened. As no current can flow through the primary winding of transformer T1, circuit 20 cannot provide the auxiliary voltages and the operation of rectifier 10 is inhibited. Relay K2 remains closed as neither of the two phases to which the inputs of circuit 12 are connected has been lost. When phase one returns, circuit 20 supplies the auxiliary voltages and rectifier 10 returns to normal operation.

Referring now to FIG. 2b, when phase two, i.e. L2, is lost, there isn't any input power to circuit 12. The coil 24 of relay K2 can no longer remain energized. Relay K2 then opens and circuit 20 is disconnected from phase three. Therefore, circuit 20 is unable to provide the auxiliary voltages and the operation of rectifier 10 is inhibited. When phase two returns, coil 24 of relay K2 is reenergized and K2 is closed. Circuit 20 can then supply the auxiliary voltages and rectifier 10 returns to normal operation.

Referring now to FIG. 2c, when phase three, i.e. L3, is lost, relay K2 remains closed as the inputs to circuit 12 are connected to phases one and two. As the relay remains closed, the end of the primary winding of T1 ordinarily connected directly to phase three is connected through circuit 12 to phase two. Circuit 12 is a relatively high impedance and, therefore, the voltage at the primary winding of T1 is lower than it is when phase three is not lost. Therefore, the voltage on the secondary winding of T1 is not high enough to allow the circuit to generate the auxiliary voltages and the operation of rectifier 10 is inhibited. When phase three returns, the voltage on the primary winding of T1 increases and circuit 20 can then provide the auxiliary voltages. Rectifier 10 returns to normal operation.

Figure 3:
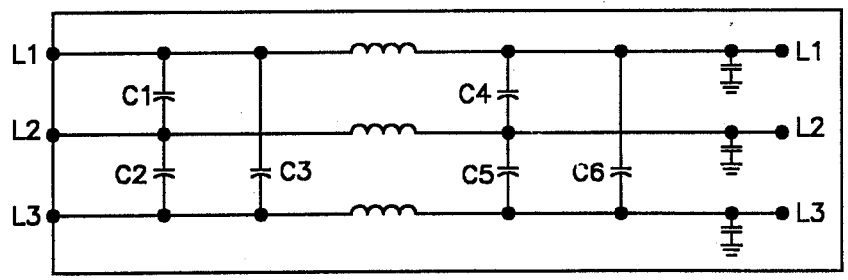
FIG. 3 is a schematic diagram of one embodiment for the input filter of the three phase rectifier.

Referring now to FIG. 3, there is shown one possible embodiment for the filter portion 16a of circuit 16. In that embodiment filter 16a includes capacitors C1, C2 and C3 at the input to the filter and capacitors C4, C5 and C6 at the output of the filter. Capacitors C1 and C4 connect phase L1 to phase L2. Capacitors C2 and C5 connect phase L2 to phase L3. Capacitors C3 and C6 connect phase L1 to phase L3. When one of the phases is lost, the capacitors connected between the lost phase and the other phases tend to partially recreate the lost phase. Therefore, instead of the lost phase having zero voltage, there appears on that phase a voltage whose amplitude is lower than the amplitude of voltage normally on that phase.

Figure 4:
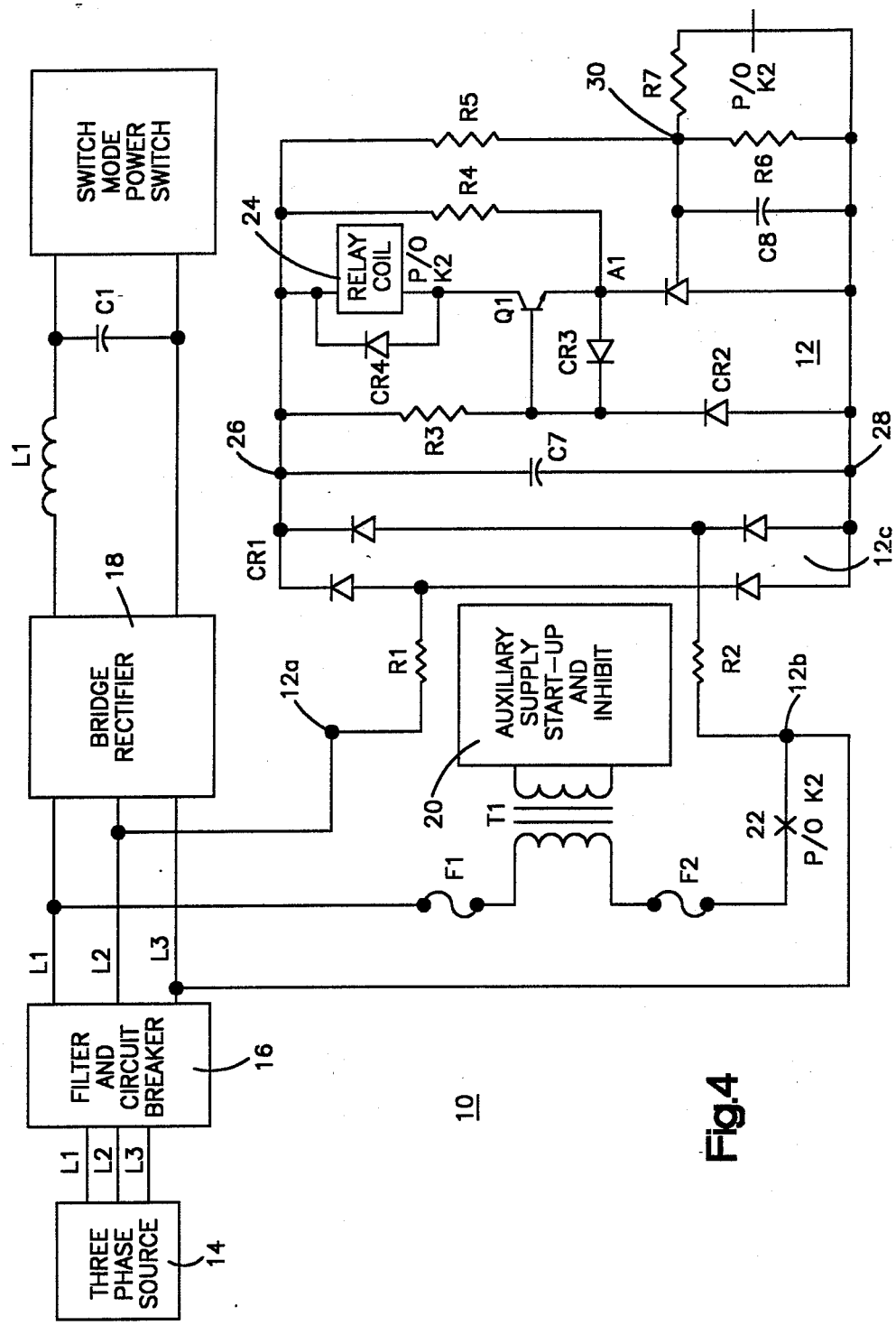
FIG. 4 is a schematic diagram for another embodiment for the loss protection circuit of the present invention.

Referring now to FIG. 4, there is shown an embodiment for loss protection circuit 12 which ensures that the operation of rectifier 10 is inhibited under the circumstances described above. In the embodiment for circuit 12 shown in FIG. 4, those elements which are identical in structure and function to like elements of the embodiment shown in FIG. 1 are given the same reference numerals as are used in FIG. 1. Therefore, only the differences will be described hereinafter.

Circuit 12 includes a capacitor C7 which is connected across the DC outputs 26 and 28 of rectifier 12c. Coil 24 of relay K2 is connected between DC output 26 and the collector of transistor Q1. The series combination of resistors R5 and R6 is connected across the DC outputs 26 and 28. The juncture 30 of that series connection is connected to an input of comparator A1. When rectifier 10 is turned on, a portion of the voltage across capacitor C7 appears across resistor R6. When that voltage rises above a reference amplitude, the comparator A1 and transistor Q1 both turn on thereby energizing the coil 24 of relay K2. Normally open contacts 22 are closed.

Upon the loss of either phase one or phase three, circuits 12 and 20 of FIG. 4 function in the same manner described for the operation of those circuits for the embodiment of FIG. 1 when either phase one or phase three is lost. Therefore, when phase one is lost, circuit 20 is unable to supply the auxiliary voltages even though the voltage which appears on that phase is not zero. When phase three is lost, the primary winding of transformer T1 is connected through circuit 12 (a relatively high impedance) to phase two and circuit 20 is unable to generate the auxiliary voltages.

When phase two is lost, the amplitude of the voltage across the inputs 12a, 12b of circuit 12 decreases from the amplitude that that voltage has when the phase is not lost. The voltage across capacitor C7 decreases in amplitude as does the voltage across resistor R6. The loss of phase two causes the voltage across R6 to fall below the reference amplitude. Comparator A1 and transistor Q1 then both turn off and coil 24 of relay K2 is deenergized. Contacts 22 open and circuit 20 is unable to provide the auxiliary voltages. Normally closed contacts 32 of the relay close and resistor R7 is placed in parallel with R6. The voltage across the parallel combination falls further below the reference level to keep relay K2 positively deenergized.

When phase two is restored, the voltage across the parallel combination of R6 and R7 increases. When that voltage rises above the reference level, comparator A1 and transistor Q1 both turn on. The coil 24 of relay K2 is energized and normally open contacts 22 are closed and normally closed contacts 32 are opened.

It is to be understood that the description of the preferred embodiments are intended to be illustrative, rather than exhaustive, of the present invention. Those of ordinary skill will be able to make certain additions, deletions, and/or modifications to the embodiments of the disclosed subject matter without departing from the spirit of the invention or its scope, as defined by the appended claims.

What is claimed is:

1. A phase loss protection circuit for a three phase rectifier, said rectifier having means responsive to the loss of either a first or second one of said three phases for inhibiting operation of said rectifier, said circuit comprising:
(a) a first input for connection to a third one of said three phases;
(b) a second input for connection to said second phase;
(c) normally open controllable switch means connecting said inhibiting means to said second input; and
(d) control means responsive to a voltage across said first and second inputs for closing said switch means, said control means responsive to a loss of said third phase to open said switch means to thereby cause said second phase to be lost to said inhibiting means.

2. The loss protection circuit of claim 1 wherein said inhibiting means has an input and said controllable switch means remains closed when said second phase is lost to connect said protection circuit in series with said inhibiting means input, said protection circuit having a relatively high impedance to reduce the voltage across said inhibiting means input, whereby said inhibiting means inhibits operation of said rectifier.

3. The loss protection circuit of claim 1 wherein said control means includes means responsive to a partial loss of said third phase to open said switch means to thereby cause said second phase to be lost to said inhibiting means.

4. The loss protection circuit of claim 3 wherein said partial loss means comprises:

(a) means for determining when said second phase is partially lost and generating a signal indicative thereof; and
(b) means responsive to said indicative signal for opening said switch means.

5. A phase loss protection circuit for a rectifier, said rectifier having means responsive to at least a partial loss of either a first or second one of said three phases for inhibiting operation of said rectifier, said circuit comprising:
(a) a first input for connection to a third one of said three phases;
(b) a second input for connection to said second phase;
(c) normally open controllable switch means connecting said inhibiting means to said second input; and
(d) control means responsive to a voltage across said first and second inputs for closing said switch means, said control means responsive to at least a partial loss of said third phase to open said switch means to thereby cause said second phase to be completely lost to said inhibiting means.

6. The loss protection circuit of claim 5 wherein said control means comprises:
(i) means for determining when said second phase is partially lost and generating a signal indicative thereof; and
(ii) means responsive to said indicative signal for opening said switch means.

* * * * *